United States Patent
Frota de Souza Filho

(10) Patent No.: US 9,937,567 B2
(45) Date of Patent: Apr. 10, 2018

(54) MODULAR DRILL

(71) Applicant: Kennametal Inc., Latrobe, PA (US)

(72) Inventor: Ruy Frota de Souza Filho, Latrobe, PA (US)

(73) Assignee: KENNAMETAL INC., Latrobe, PA (US)

( * ) Notice: Subject to any disclaimer, the term of this patent is extended or adjusted under 35 U.S.C. 154(b) by 10 days.

(21) Appl. No.: 14/877,604

(22) Filed: Oct. 7, 2015

(65) Prior Publication Data

US 2017/0100783 A1 Apr. 13, 2017

(51) Int. Cl.
*B23B 51/02* (2006.01)
*B23B 51/06* (2006.01)

(52) U.S. Cl.
CPC .............. *B23B 51/02* (2013.01); *B23B 51/06* (2013.01); *B23B 2250/12* (2013.01); *B23B 2251/02* (2013.01); *B23B 2251/408* (2013.01); *Y10T 408/9097* (2015.01)

(58) Field of Classification Search
CPC . B23B 51/02; B23B 2251/02; B23B 2251/50; Y10T 408/907; Y10T 408/909; Y10T 408/9093; Y10T 408/9095; Y10T 408/9097; Y10T 408/9098; Y10T 408/90987; Y10T 408/90993; Y10T 408/892

See application file for complete search history.

(56) References Cited

U.S. PATENT DOCUMENTS

| | | |
|---|---|---|
| 22,394 A | 12/1858 | White |
| 40,297 A | 10/1863 | Wakefield |
| 273,388 A | 3/1883 | Peatt |
| 273,391 A | 3/1883 | Rader et al. |
| 329,660 A | 11/1885 | Lord |
| 658,216 A | 8/1900 | Munger |
| 690,093 A | 12/1901 | Beach |
| 756,339 A | 4/1904 | Down |
| 932,071 A | 8/1909 | Urbscheit |
| 1,461,548 A | 7/1923 | West |

(Continued)

FOREIGN PATENT DOCUMENTS

| | | |
|---|---|---|
| AT | 9431 B | 10/1902 |
| CN | 1204976 A | 1/1999 |

(Continued)

OTHER PUBLICATIONS

Oct. 20, 2016 Office action (3 months).

(Continued)

*Primary Examiner* — Sunil K Singh
*Assistant Examiner* — Nicole N Ramos
(74) *Attorney, Agent, or Firm* — Ian K. Samways

(57) ABSTRACT

A drill has a replaceable cutting head mounted to a shank in an interlocking fashion. The shank has a pocket with at least one flat, vertically-angled retention surface located closer to a rotational axis than at least one driving surface. Similarly, the cutting head has at least one vertically-angled retention surface located closer to the rotational axis of the drill than at least one driven surface. As a result of the relative locations between the surfaces with respect to the rotational axis, the stresses and fatigue imposed on the drill are minimized, thereby prolonging tool life.

17 Claims, 6 Drawing Sheets

(56) References Cited

U.S. PATENT DOCUMENTS

| | | |
|---|---|---|
| 2,158,120 A | 5/1939 | Hirschberg |
| 2,289,683 A | 7/1942 | Malone |
| 2,294,969 A | 9/1942 | Engvall |
| 3,140,749 A | 7/1964 | Dionisotti |
| 3,153,356 A | 10/1964 | Dearborn |
| 3,293,727 A | 12/1966 | Simms |
| 3,359,837 A | 12/1967 | Andreasson |
| 3,410,749 A | 11/1968 | Chmiel |
| 3,434,553 A | 3/1969 | Weller |
| 3,548,688 A | 12/1970 | Kuch |
| 3,765,496 A | 10/1973 | Flores |
| 4,293,253 A | 10/1981 | Ott |
| D262,219 S | 12/1981 | Lassiter |
| D263,598 S | 3/1982 | Lassiter |
| D273,387 S | 4/1984 | Lassiter |
| D273,388 S | 4/1984 | Lassiter |
| D273,389 S | 4/1984 | Lassiter |
| D273,390 S | 4/1984 | Lassiter |
| D273,391 S | 4/1984 | Lassiter |
| D273,682 S | 5/1984 | Lassiter |
| D274,436 S | 6/1984 | Lassiter |
| 4,561,812 A | 12/1985 | Linden |
| 4,744,704 A | 5/1988 | Galvefors |
| 4,844,643 A | 7/1989 | Icks |
| 5,024,563 A | 6/1991 | Randall |
| 5,114,286 A | 5/1992 | Calkins |
| 5,154,549 A | 10/1992 | Isobe |
| 5,154,550 A | 10/1992 | Isobe |
| 5,228,812 A | 7/1993 | Noguchi |
| 5,346,335 A | 9/1994 | Harpaz |
| 5,429,199 A | 7/1995 | Sheirer |
| 5,452,971 A | 9/1995 | Nevills |
| 5,509,761 A | 4/1996 | Grossman |
| 5,634,747 A | 6/1997 | Tukala |
| 5,649,794 A | 7/1997 | Kress |
| 5,685,671 A | 11/1997 | Packer |
| 5,769,577 A | 6/1998 | Boddy |
| 5,791,838 A | 8/1998 | Hamilton |
| 5,863,162 A | 1/1999 | Karlsson |
| 5,904,455 A | 5/1999 | Krenzer |
| 5,957,631 A | 9/1999 | Hecht |
| 5,971,673 A | 10/1999 | Berglund |
| 5,980,166 A | 11/1999 | Ogura |
| 5,988,953 A | 11/1999 | Berglund |
| 5,996,714 A | 12/1999 | Massa |
| 6,000,000 A | 12/1999 | Hawkins |
| 6,012,881 A | 1/2000 | Scheer |
| 6,045,301 A | 4/2000 | Kammermeier |
| 6,059,492 A | 5/2000 | Hecht |
| 6,071,045 A | 6/2000 | Janness |
| 6,109,841 A | 8/2000 | Johne |
| 6,123,488 A | 9/2000 | Kasperik |
| 6,276,879 B1 | 8/2001 | Hecht |
| 6,447,218 B1 | 9/2002 | Lagerberg |
| 6,481,938 B2 | 11/2002 | Widin |
| 6,485,235 B1 | 11/2002 | Mast |
| 6,506,003 B1 | 1/2003 | Erickson |
| 6,514,019 B1 | 2/2003 | Schulz |
| 6,524,034 B2 | 2/2003 | Eng |
| 6,530,728 B2 | 3/2003 | Eriksson |
| 6,582,164 B1 | 6/2003 | McCormick |
| 6,595,305 B1 | 7/2003 | Dunn |
| 6,595,727 B2 | 7/2003 | Arvidsson |
| 6,626,614 B2 | 9/2003 | Nakamura |
| 6,648,561 B2 | 11/2003 | Kraemer |
| 6,840,717 B2 | 1/2005 | Eriksson |
| 7,008,150 B2 | 3/2006 | Krenzer |
| 7,048,480 B2 | 5/2006 | Borschert |
| 7,070,367 B2 | 7/2006 | Krenzer |
| 7,114,892 B2 | 10/2006 | Hansson |
| 7,125,207 B2 | 10/2006 | Craig |
| 7,134,816 B2 | 11/2006 | Brink |
| 7,189,437 B2 | 3/2007 | Kidd |
| 7,237,985 B2 | 7/2007 | Leuze |
| 7,306,410 B2 | 12/2007 | Borschert |
| 7,309,196 B2 | 12/2007 | Ruy Frota de Souza |
| 7,311,480 B2 | 12/2007 | Heule et al. |
| 7,360,974 B2 | 4/2008 | Borschert |
| 7,377,730 B2 | 5/2008 | Hecht |
| 7,407,350 B2 | 8/2008 | Hecht |
| 7,431,543 B2 | 10/2008 | Buettiker |
| 7,467,915 B2 | 12/2008 | de Souza |
| 7,559,382 B2 | 7/2009 | Koch |
| 7,591,617 B2 | 9/2009 | Borschert |
| D607,024 S | 12/2009 | Dost |
| 7,625,161 B1 | 12/2009 | Ruy Frota de Souza |
| 7,677,842 B2 | 3/2010 | Park |
| 7,740,472 B2 | 6/2010 | Delamarche |
| 7,775,751 B2 | 8/2010 | Hecht |
| 7,832,967 B2 | 11/2010 | Borschert |
| D632,320 S | 2/2011 | Chen |
| D633,534 S | 3/2011 | Chen |
| 7,972,094 B2 | 7/2011 | Men |
| RE42,644 E | 8/2011 | Jonsson |
| 7,997,832 B2 | 8/2011 | Prichard |
| 8,007,208 B2 | 8/2011 | Noureddine |
| 8,021,088 B2 | 9/2011 | Hecht |
| 8,142,116 B2 | 3/2012 | Frejd |
| D668,697 S | 10/2012 | Hsu |
| D669,923 S | 10/2012 | Watson |
| 8,366,358 B2 | 2/2013 | Borschert |
| 8,376,669 B2 | 2/2013 | Jaeger |
| 8,430,609 B2 | 4/2013 | Frejd |
| 8,449,227 B2 | 5/2013 | Danielsson |
| 8,534,966 B2 | 9/2013 | Hecht |
| 8,556,552 B2 | 10/2013 | Hecht |
| 8,596,935 B2 | 12/2013 | Fang |
| 8,678,722 B2 | 3/2014 | Aare |
| 8,678,723 B2 | 3/2014 | Osawa |
| RE44,915 E | 5/2014 | de Souza |
| 8,721,235 B2 | 5/2014 | Kretzschmann |
| D708,034 S | 7/2014 | Huang |
| 8,784,018 B2 | 7/2014 | Päbel |
| 8,784,019 B2 | 7/2014 | Päbel |
| D711,719 S | 8/2014 | DeBaker |
| 8,807,888 B2 | 8/2014 | Borschert |
| 8,882,413 B2 | 11/2014 | Hecht |
| 8,931,982 B2 | 1/2015 | Osawa |
| 8,992,142 B2 | 3/2015 | Hecht |
| 9,028,180 B2 | 5/2015 | Hecht |
| 9,050,659 B2 | 6/2015 | Schwaegerl et al. |
| 9,073,128 B2 | 7/2015 | Mack |
| 9,079,255 B2 | 7/2015 | Jager |
| 9,162,295 B2 | 10/2015 | Päbel |
| D742,714 S | 11/2015 | King, Jr. |
| D742,948 S | 11/2015 | Kenno |
| 9,180,650 B2 | 11/2015 | Fang |
| 9,205,498 B2 | 12/2015 | Jaeger |
| 9,248,512 B2 | 2/2016 | Aare |
| 9,296,049 B2 | 3/2016 | Schwaegerl |
| 9,302,332 B2 | 4/2016 | Scanlon |
| 9,371,701 B2 | 6/2016 | Cox |
| 9,481,040 B2 | 11/2016 | Schwaegerl |
| 9,498,829 B2 | 11/2016 | Zabrosky |
| 2001/0033780 A1 | 10/2001 | Berglund |
| 2002/0159851 A1 | 10/2002 | Krenzer |
| 2002/0168239 A1 | 11/2002 | Mast |
| 2002/0195279 A1 | 12/2002 | Bise |
| 2003/0039523 A1 | 2/2003 | Kemmer |
| 2003/0091402 A1 | 5/2003 | Lindblom |
| 2004/0240949 A1 | 12/2004 | Pachao-Morbitzer |
| 2005/0084352 A1* | 4/2005 | Borschert ............ B23B 51/02 408/226 |
| 2005/0135888 A1 | 6/2005 | Stokey et al. |
| 2006/0072976 A1 | 4/2006 | Frota de Souza |
| 2006/0093449 A1* | 5/2006 | Hecht ............ B23B 51/02 408/231 |
| 2008/0003072 A1 | 1/2008 | Kim |
| 2008/0175676 A1 | 7/2008 | Prichard |
| 2008/0175677 A1 | 7/2008 | Prichard |
| 2008/0181741 A1 | 7/2008 | Borschert |
| 2008/0193231 A1 | 8/2008 | Mats Jonson |
| 2008/0193237 A1 | 8/2008 | Men |
| 2009/0044986 A1 | 2/2009 | Jaeger |

(56) References Cited

U.S. PATENT DOCUMENTS

| | | | |
|---|---|---|---|
| 2009/0067942 A1 | 3/2009 | Tanaka | |
| 2009/0071723 A1 | 3/2009 | Peter | |
| 2009/0116920 A1 | 5/2009 | Bae | |
| 2009/0123244 A1 | 5/2009 | Buettiker | |
| 2009/0311060 A1 | 12/2009 | Frejd | |
| 2010/0021253 A1* | 1/2010 | Frejd | B23B 51/02 408/200 |
| 2010/0092259 A1 | 4/2010 | Borschert | |
| 2010/0143059 A1 | 6/2010 | Hecht | |
| 2010/0247255 A1 | 9/2010 | Nitzsche | |
| 2010/0266357 A1* | 10/2010 | Kretzschmann | B23B 51/02 408/204 |
| 2010/0272529 A1 | 10/2010 | Rozzi | |
| 2010/0307837 A1 | 12/2010 | King | |
| 2010/0322723 A1 | 12/2010 | Danielsson | |
| 2010/0322728 A1 | 12/2010 | Aare | |
| 2010/0322729 A1* | 12/2010 | Pabel | B23B 51/02 408/200 |
| 2010/0322731 A1 | 12/2010 | Aare | |
| 2011/0020072 A1 | 1/2011 | Chen | |
| 2011/0020073 A1 | 1/2011 | Chen | |
| 2011/0020077 A1 | 1/2011 | Fouquer | |
| 2011/0020086 A1 | 1/2011 | Borschert | |
| 2011/0027021 A1 | 2/2011 | Nelson | |
| 2011/0081212 A1 | 4/2011 | Spichtinger | |
| 2011/0097168 A1 | 4/2011 | Jager | |
| 2011/0110735 A1 | 5/2011 | Klettenheimer | |
| 2011/0110739 A1 | 5/2011 | Frisendahl | |
| 2011/0168453 A1 | 7/2011 | Kersten | |
| 2011/0229277 A1 | 9/2011 | Hoffer | |
| 2011/0236145 A1 | 9/2011 | Päbel | |
| 2011/0299944 A1 | 12/2011 | Häfermann | |
| 2011/0318128 A1 | 12/2011 | Schwägerl et al. | |
| 2012/0003056 A1 | 1/2012 | Jaeger | |
| 2012/0014760 A1* | 1/2012 | Glimpel | B23B 51/02 408/230 |
| 2012/0082518 A1 | 4/2012 | Woodruff | |
| 2012/0087746 A1 | 4/2012 | Fang | |
| 2012/0087747 A1 | 4/2012 | Fang | |
| 2012/0099937 A1* | 4/2012 | Osawa | B23B 51/02 408/200 |
| 2012/0121347 A1* | 5/2012 | Osawa | B23B 51/02 408/57 |
| 2012/0308319 A1 | 12/2012 | Sampath | |
| 2012/0315101 A1* | 12/2012 | Osawa | B23B 51/02 408/226 |
| 2013/0183107 A1 | 7/2013 | Fang | |
| 2013/0183112 A1 | 7/2013 | Schwagerl | |
| 2013/0209189 A1 | 8/2013 | Borschert | |
| 2013/0223943 A1 | 8/2013 | Gey | |
| 2013/0259590 A1 | 10/2013 | Shaheen | |
| 2013/0266389 A1* | 10/2013 | Hecht | B23B 51/02 408/229 |
| 2014/0023449 A1 | 1/2014 | Jonsson et al. | |
| 2014/0255115 A1 | 9/2014 | Zabrosky | |
| 2014/0255116 A1 | 9/2014 | Myers | |
| 2014/0301799 A1 | 10/2014 | Schwaegerl | |
| 2014/0321931 A1 | 10/2014 | Gey | |
| 2014/0348602 A1 | 11/2014 | Schwaegerl | |
| 2015/0063926 A1 | 3/2015 | Wu | |
| 2015/0063931 A1 | 3/2015 | Wu | |
| 2015/0104266 A1 | 4/2015 | Guter | |
| 2015/0174671 A1 | 6/2015 | Maurer | |
| 2015/0266107 A1 | 9/2015 | Gonen | |
| 2015/0273597 A1 | 10/2015 | Aliaga | |
| 2015/0298220 A1 | 10/2015 | Ach | |
| 2015/0321267 A1 | 11/2015 | Takai | |
| 2015/0328696 A1 | 11/2015 | Wang | |
| 2016/0001379 A1 | 1/2016 | Kauper | |
| 2016/0001381 A1 | 1/2016 | Lach | |
| 2016/0016236 A1 | 1/2016 | Evans | |
| 2016/0031016 A1 | 2/2016 | Takai | |
| 2016/0059323 A1 | 3/2016 | Riester | |
| 2016/0207122 A1 | 7/2016 | Chen | |
| 2016/0229017 A1 | 8/2016 | Guy | |
| 2016/0263663 A1 | 9/2016 | Schwaegerl | |
| 2016/0263664 A1 | 9/2016 | Son | |
| 2016/0263666 A1 | 9/2016 | Myers | |
| 2016/0311035 A1 | 10/2016 | Peng | |

FOREIGN PATENT DOCUMENTS

| | | |
|---|---|---|
| CN | 1258240 A | 6/2000 |
| CN | 1616170 A | 5/2005 |
| CN | 100455390 C | 1/2009 |
| CN | 101605622 A | 12/2009 |
| CN | 104588739 A | 5/2015 |
| CN | 204565232 U | 7/2015 |
| CN | 104759664 A | 8/2015 |
| CN | 204545517 U | 8/2015 |
| DE | 94340 | 9/1896 |
| DE | 384720 C | 11/1923 |
| DE | 524677 | 5/1931 |
| DE | 118806 | 9/1984 |
| DE | 3733298 C2 | 4/1992 |
| DE | 19605157 | 9/1996 |
| DE | 19543233 | 5/1997 |
| DE | 29809638 | 9/1998 |
| DE | 19945097 | 3/2001 |
| DE | 102004022747 A1 | 11/2005 |
| DE | 10201220069 | 7/2013 |
| DE | 102012212146 | 1/2014 |
| DE | 102013205889 | 5/2014 |
| EP | 118806 | 9/1984 |
| EP | 0599393 B1 | 2/1996 |
| EP | 1136161 | 9/2001 |
| EP | 813459 | 7/2003 |
| EP | 1476269 | 10/2009 |
| EP | 1996358 | 11/2011 |
| EP | 2524755 | 11/2012 |
| FR | 907980 | 3/1946 |
| GB | 17961 | 12/1915 |
| GB | 1396855 | 5/1975 |
| JP | 11019812 A | 1/1999 |
| JP | 2002113606 A | 4/2002 |
| JP | 2004255533 A | 9/2004 |
| JP | 2005169542 | 6/2005 |
| JP | 2008500195 A | 1/2008 |
| JP | 2011036977 A | 2/2011 |
| WO | 8403241 | 8/1984 |
| WO | WO9627469 | 9/1996 |
| WO | 9853943 | 12/1998 |
| WO | WO03031104 A1 | 4/2003 |
| WO | 2007107294 | 9/2007 |
| WO | WO2008072840 A2 | 6/2008 |
| WO | WO2009128775 A1 | 10/2009 |
| WO | WO2010102793 A1 | 9/2010 |
| WO | 2015/064904 A1 | 9/2014 |

OTHER PUBLICATIONS

U.S. Appl. No. 10/318,128, filed Dec. 29, 2011, Schwägerl. Jürgen.
U.S. Appl. No. 90/044,986, filed Feb. 19, 2009, Jaeger, Horst Manfred.
U.S. Appl. No. 10/020,086, filed Jan. 27, 2011, Borschert, Bernhard.
U.S. Appl. No. 60/093,449, filed May 4, 2005, Hecht.
U.S. Appl. No. 10/168,453, filed Jul. 14, 2011, Kersten, Heinrich.
Mar. 21, 2017 Office action (3 months).
Apr. 6, 2017 First office action.
Mar. 22, 20172 First office action.
Apr. 6, 2017 Second Office Action.
Apr. 1, 2017 First office action.
May 9, 2017 Second Office Action.
Apr. 19, 2017 First office action.
May 25, 2017 Office action (3 months).
Jun. 27, 2017 Office action (3 months).
Sep. 2, 2015 First office action.
Jul. 7, 2015 Office action (3 months).
Jul. 16, 2015 International Search Report Transmitted.
Oct. 22, 2016 Office action (3 months).

(56) References Cited

OTHER PUBLICATIONS

Nov. 3, 2015 Final Office Action.
Nov. 6, 2015 Office Action.
Oct. 12, 2015 First office action.
Dec. 8, 2015 Office action (3 months).
Feb. 23, 2016 Office action (3 months).
May 13, 2014—Office Action.
Mar. 7, 2016 Final Office Action.
Mar. 23, 2016 First office action.
Apr. 8, 2016 Office action (2 months).
Apr. 12, 2016 Second Office Action.
Jun. 16, 2016 Office action (3 months).
Jul. 29, 2016 Office action (3 months).
Sep. 27, 2016 First office action.
Oct. 25, 2016 Office action (3 months).
Nov. 15, 2016 EPO Notification.
Nov. 23, 2016 Final Office Action.
Nov. 16, 2016 Second Office Action.
Dec. 30, 2016 Final Office Action.

* cited by examiner

MODULAR DRILL

FIELD OF THE INVENTION

The present invention relates to cutting tools, and more particularly to modular drills having replaceable cutting tips.

BACKGROUND OF THE INVENTION

Drills having replaceable cutting tips mounted on shanks are known. The cutting heads and shanks display continuous and complementing configuration as fluted drills. To this end, each shank has structure for retaining and rotating an associated cutting head. The associated cutting head has complementing structure for being retained and rotated by the shank. While these devices will operate under some circumstances, closer analysis reveals that their useful lives are potentially unduly limited. More specifically, the retaining and drive structure of the shank is subject to deformation and failure during its service life due to concentration of stresses imposed during when drilling on uneven or angled surfaces.

SUMMARY OF THE INVENTION

The modifications of the invention alter stresses imposed on the shanks such that the shanks either do not undergo deformation and outright failure while in service or alternatively, increase the service life achievable before deformation renders the tool unusable. More specifically, the problem of deformation and failure of the retaining and drive structure of the shank is solved by providing vertically-angled retaining surfaces at a location closer to the central, rotational axis of the drill independent from the drive surfaces, thereby providing additional support to the lateral forces and preventing stresses from rising on critical pocket areas.

In one aspect, a cutting tool assembly for conducting rotary cutting operations on a work piece comprises a tool shank and a replaceable cutting head which is installed on and engages the tool shank, the tool shank and the cutting head having a common rotational axis and complimentary peripheral surfaces when assembled together. The shank has a pocket for coupling to the cutting head, an interlocking member arranged to retain the cutting head when the cutting head is installed within the pocket, at least one abutment surface abutting the cutting head when the cutting head is installed within the pocket, at least one driving surface arranged to rotate the cutting head when the shank is rotated with the cutting head installed within the pocket, and at least one vertically-angled retention surface located closer to the rotational axis than the at least one driving surface. The cutting head has a peripheral base surface facing the pocket and a cylindrical member located centrally along the common rotational axis, a cutting portion at a leading end of the cutting tool assembly, and a shank connection portion opposite the cutting portion and facing a trailing end of the shank connection portion, a corresponding interlocking member for engaging the interlocking member of the shank, a cutting head abutment surface abutting the shank when the cutting head is installed within the pocket, a driven surface oriented to abut the driving surface of the shank when the cutting head is installed within the pocket, and a retention surface oriented to abut the at least one vertically-angled retention surface of the shank when the cutting head is installed within the pocket.

In another aspect, a cutting tool assembly for conducting rotary cutting operations on a work piece comprises a tool shank and a replaceable cutting head which is installed on and engages the tool shank, the tool shank and the cutting head having a common rotational axis and complimentary peripheral surfaces when assembled together. The shank has a pocket for coupling to the cutting head, an interlocking member arranged to retain the cutting head when the cutting head is installed within the pocket, at least one axial abutment surface abutting the cutting head when the cutting head is installed within the pocket, at least one driving surface arranged to rotate the cutting head when the shank is rotated with the cutting head installed within the pocket, and at least one vertically-angled retention surface located radially inward with respect to the at least one driving surface. The cutting head has a peripheral base surface facing the pocket and a cylindrical member located centrally along the common rotational axis, a cutting portion at a leading end of the cutting tool assembly, and a shank connection portion opposite the cutting portion and facing a trailing end of the shank connection portion, a corresponding interlocking member for engaging the interlocking member of the shank, a cutting head abutment surface abutting the shank when the cutting head is installed within the pocket, a driven surface oriented to abut the driving surface of the shank when the cutting head is installed within the pocket, and a retention surface oriented to abut the at least one vertically-angled retention surface of the shank when the cutting head is installed within the pocket.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
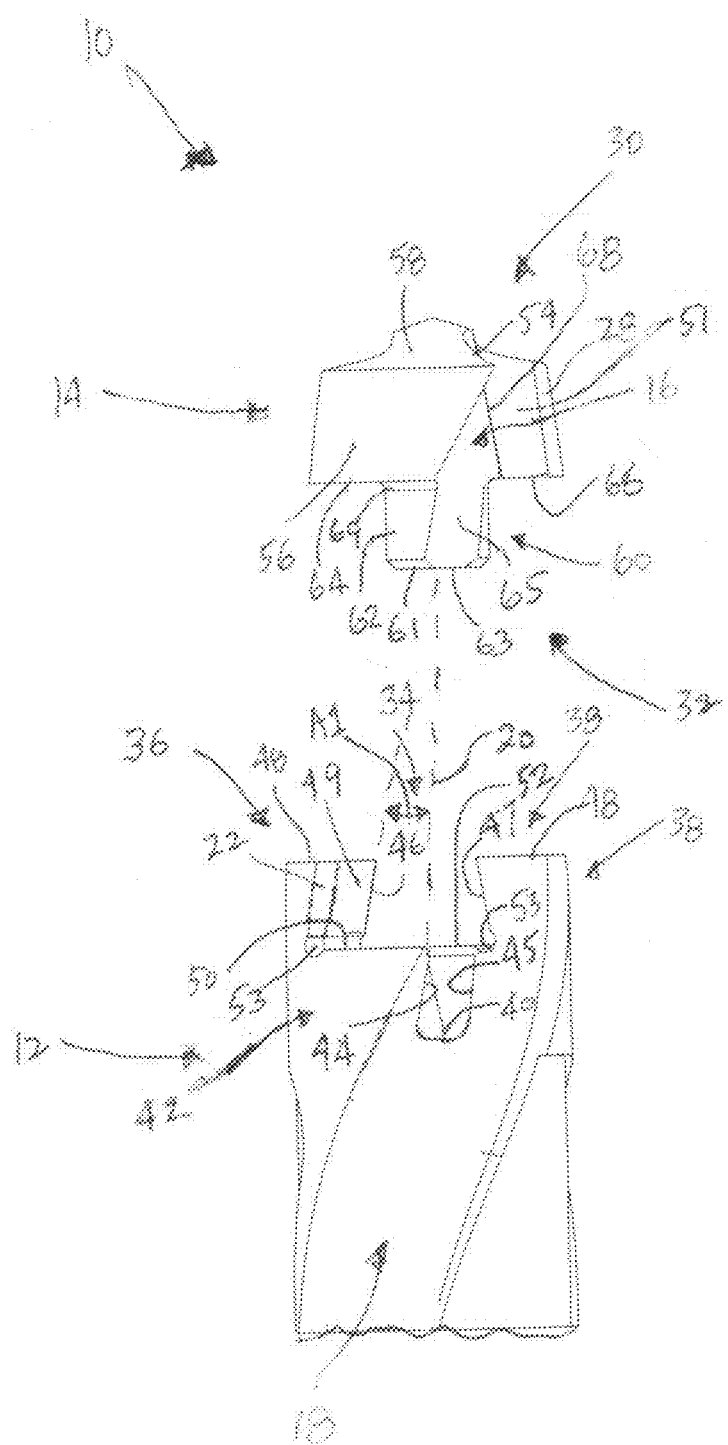
FIG. 1 is a partial, exploded view of a modular drill according to an embodiment of the invention.
Figure 2:
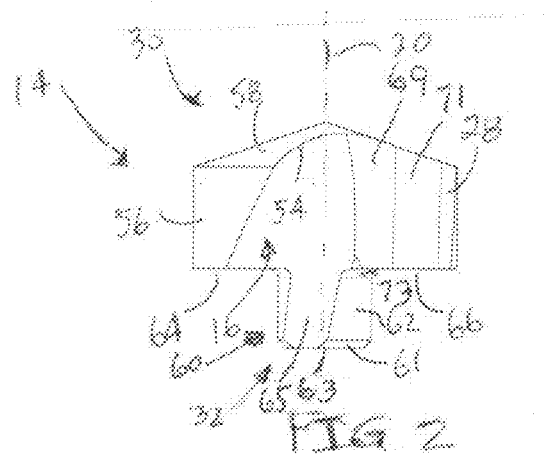
FIG. 2 is a side elevational view of a cutting head of the modular drill according to an embodiment of the invention.
Figure 3:
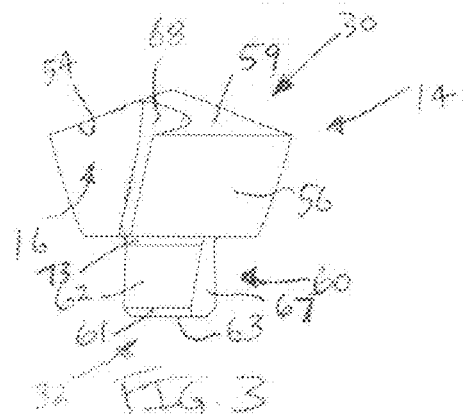
FIG. 3 is another side elevational view of the cutting head of FIG. 2.
Figure 4:
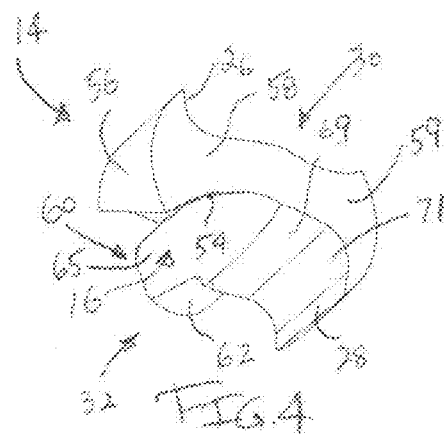
FIG. 4 is a top perspective view of the cutting head of FIG. 2.
Figure 5:
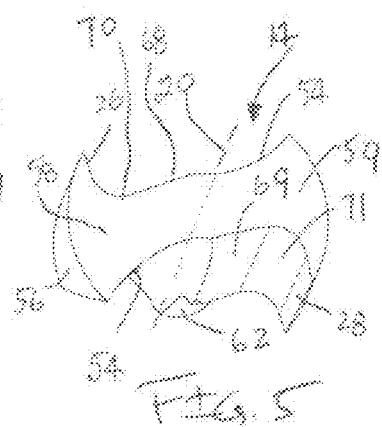
FIG. 5 is another top perspective view of the cutting head of FIG. 2.
Figure 6:
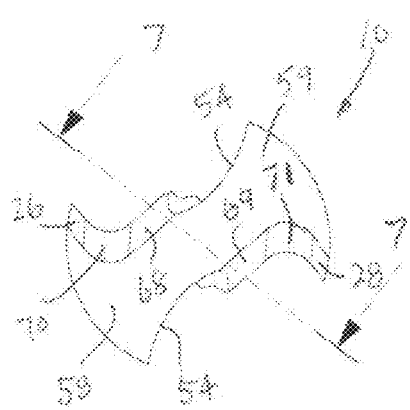
FIG. 6 is another top perspective view of the cutting head of FIG. 2.
Figure 7:
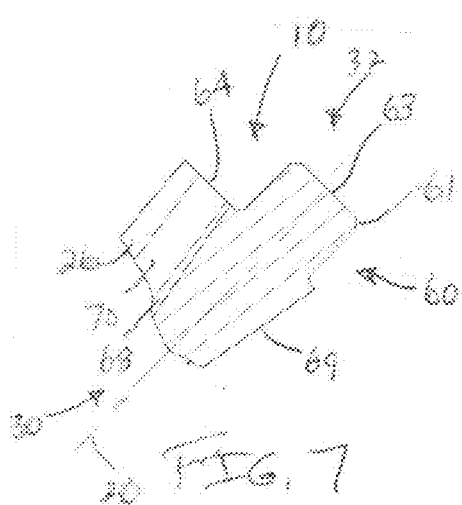
FIG. 7 is a cross-sectional view of the cutting head of FIG. 2 taken along line 7-7 of FIG. 6.

Referring now to FIG. 1, a cutting tool assembly 10 for conducting rotary cutting operations on a work piece (not shown) is shown according to an embodiment of the invention. In general, the cutting tool assembly 10 includes a tool shank 12 and a replaceable cutting head 14, which is installed on and engages tool shank 12. In the illustrated embodiment, the cutting tool assembly 10 comprises a modular drill, which in the preferred embodiments is of the so-called twist drill type, having helical flutes disposed along the sides of the drill. Various views of the cutting head 14 are shown in FIGS. 2-7, while various views of the shank 12 are shown in FIGS. 8-12.

In the embodiment of FIG. 1, two flutes are provided in diametric opposition to one another, only one flute being visible. The visible flute has a lateral recess forming part of a flute, or cutting head flute portion 16 formed in cutting head 14. A corresponding or complementing lateral recess or shank flute portion 18 is formed in the shank 12. The depiction of FIG. 1 shows the cutting head 14 in a position for initially being installed on the shank 12. Installation of the cutting head 14 requires that the cutting head 14 be lowered into abutment or near abutment with the shank 12 and rotated in a direction opposite that of rotation during cutting operations. This installation procedure will both interlock the cutting head 14 with the shank 12 at certain respective mating peripheral surfaces in a manner precluding disengagement in the axial direction, taken with respect to the axis 20, and will also assure abutment of the driving surfaces 22, 24 of the shank 12 with corresponding driven surfaces 26, 28 of the cutting head 14. The driving surfaces 22, 24 of the shank 12 are oriented to abut and bear against the driven surfaces 26, 28 of cutting head 14, and thereby rotate cutting head 14 in tandem with the shank 12 when the shank 12 is rotated by its associated cutting tool, such as a hand drill, drill press, machine tool, or the like (none shown).

In addition, a threaded member (not shown) can be inserted through an axial aperture (not shown) in the shank 12 such that the threaded member can be threaded into a threaded hole (not shown) in the bottom 63 of the cutting head 14 to securely hold the cutting head 14 in place. Further, a threaded member (not shown) can be inserted through a radial aperture (not shown) in the shank 12 such that threaded member can be threaded into the shank 12 and engage the cylindrical surface 62 of the cylindrical member 60 of the cutting head 12 to securely hold the cutting head 12 in place. A notch or flat (not shown) may be necessary when engaging the cylindrical surface 62. Various views of the cutting head 14 installed on the shank 12 are shown in FIGS. 13-16.

Once the cutting head 14 is installed on the shank 12, the flute collectively formed by the cutting head flute portion 16 and the shank flute portion 18 will align to form a flute in generally continuous and undistorted fashion. A similar flute is of course formed on the other side of the cutting tool 10. Although two flutes are preferred, any number of flutes, including only one, is possible.

In the depiction of FIG. 1, the cutting head flute portion 16 emerges at a leading end 30 of the cutting tool 10. The leading end 30 is defined for semantic purposes, and is that end which engages a work piece (not shown) when cutting. During cutting operations, the cutting tool 10 is mounted in the rotary cutting tool, rotated, and advanced progressively into the work piece (not shown) as cutting progresses. That end of cutting tool located oppositely leading end 30 is termed the trailing end 32. The terms "leading end" and "trailing end" are semantic devices which apply equally to shank 12 and cutting head 14 as they connote directional orientation with respect to longitudinal and rotational axis 20 rather than specific structure. The leading end 30 is that which penetrates a work piece (not shown), and the trailing end 32 is that end opposed to the leading end 30.

The portion of the shank 12 that couples to and rotates the cutting head 14 is referred to as a pocket 34. The principal elements of pocket 34 include two generally symmetrical and similar castellated wall sections 36, 38. The wall section 36 will be described, it being understood that wall section 38 is a generally symmetrical counterpart thereof. Each wall section 36, 38 is essentially a continuation of the body of shank 12 that projects upwardly in the depiction of FIG. 1 past a central floor portion 40 of the shank 12, along the outer periphery of shank 12. Each wall section 36, 38 has a smooth outer surface 42 that conforms to and is generally coextensive with the generally cylindrical outer surface of the cutting tool 10.

Each wall section 36, 38 has an internally facing, generally cylindrical surface 44, 45, a flat, vertically-angled retention surface 46, 47, and a radius blend 49, 51 extending between the vertically-angled retention surfaces 46, 47 and the driving surfaces 22, 24. The term "vertically-angled" is defined as being formed at a non-zero angle (i.e. non-parallel) with respect to the rotational axis 20 of the assembly 10. The angle, A1, of the retention surfaces 46, 47 can be between about five (5) degrees and about fifteen (15) degrees with respect to the rotational axis 20, as shown in FIG. 1. A radiused surface 41 may be located between the floor portion 40 and the surfaces 44, 45 to provide a smooth transition between the floor portion 40 and the surfaces 44, 45, thereby reducing stresses caused by the interference fit between the shank 12 and the cutting head 12 and forces exerted on the assembly 10 during machining operations. The term "interior" referring to those surfaces facing axis 20. It is noted that the vertically-angled retention surfaces 46, 47 of the shank 12 are closer to the rotation axis 20 than the driving surfaces 22, 24 (and the radius blends 49, 51) of the shank 12. In other words, the retention surfaces 46, 47 of the shank 12 are radially inward (i.e., closer to the rotational axis 20) with respect to the driving surfaces 22, 24 (and radius blends 49, 51) of the shank 12.

One advantage of the vertically-angled retention surfaces 46, 47 being flat is that stresses will be lower in the undercut region (adjacent to those walls) when compared for example to a conical surface, when side loads (generally perpendicular to the retention surfaces) occur in the drilling process. Therefore the pocket 34 has a higher reliability and cutting head 14 is more securely held in the shank 12 during machining operations. Another advantage of the retention surfaces 46, 47 being flat is that a larger cross section between the outer surface 42 and the retention walls 46, 47 can be achieved, allowing sufficient space for coolant holes 78 without sacrificing strength of the pocket 42. It is also noted that the driving surfaces 22, 24 are farthest from the rotational axis 20 than the radius blends 49, 51 and the vertically-angled retention surfaces 46, 47. The advantage of having the drive surfaces 22, 24 completely separated from the retention surfaces 46, 47 is that stresses caused by the machining operation will not occur in the same region of the undercut 53, and therefore the maximum stress value will be lower. Thus, a longer fatigue life can be achieved by lowering the stresses.

Figure 8:
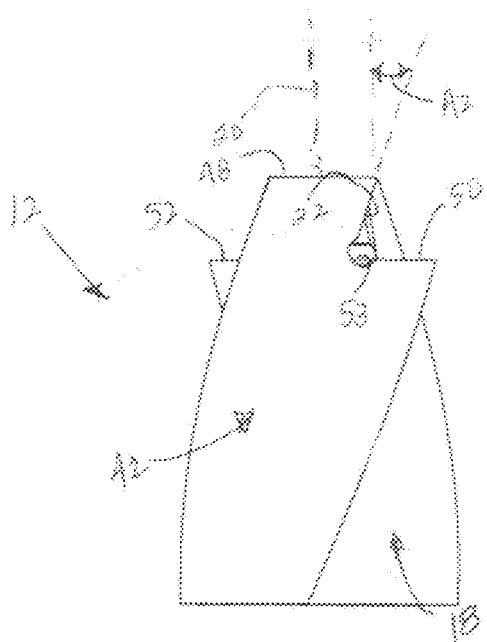
FIG. 8 is a side elevation view of a shank of the modular drill according to an embodiment of the invention.
Figure 9:
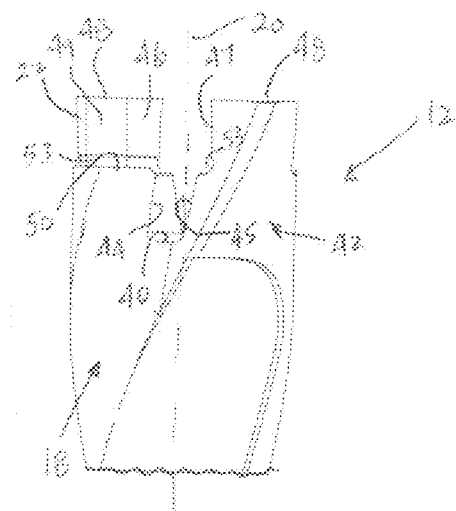
FIG. 9 is another side elevational view of the shank of FIG. 8.
Figure 10:
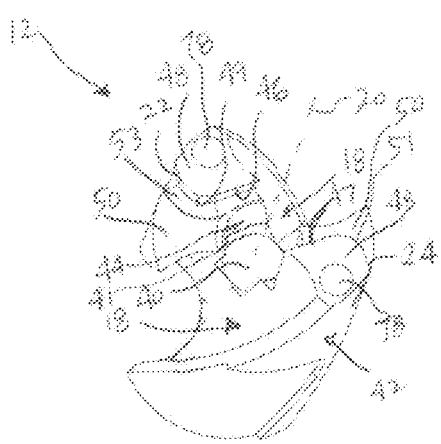
FIG. 10 is a top perspective view of the shank of FIG. 8.
Figure 11:
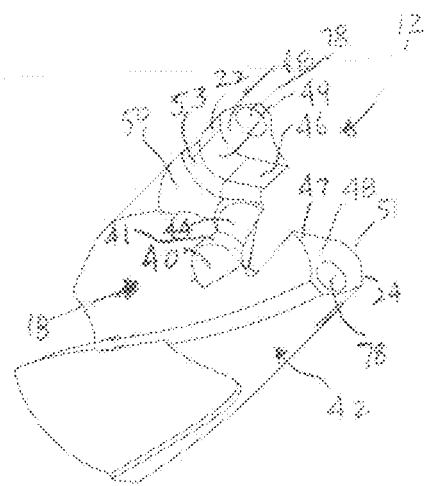
FIG. 11 is another top perspective view of the shank of FIG. 8.

The driving surfaces 22, 24 can be vertical, on a plane parallel to axis 20, or angled forwardly. The optimum range for the angle, A2, formed between the driving surfaces 22, 24 and a vertical plane, P, parallel to the rotational axis 20 is between about zero (0) degrees and about twenty (20) degrees, as shown in FIG. 8.

Figure 12:
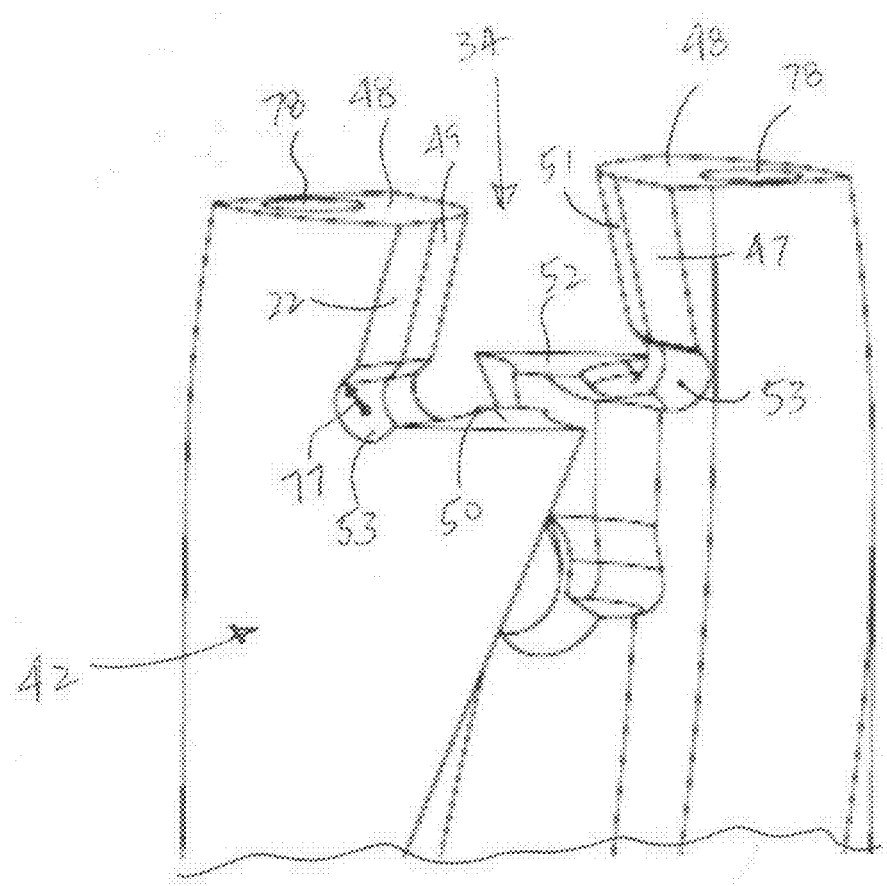
FIG. 12 is an enlarged partial perspective view of the pocket of the shank showing the elliptically shaped undercut according to an embodiment of the invention.
Figure 13:
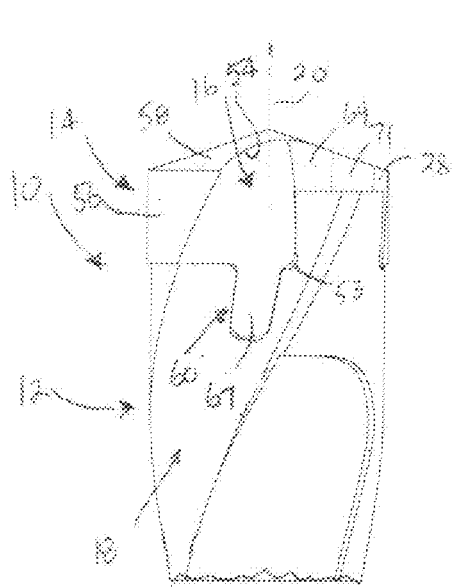
FIG. 13 is a side elevational view of the assembled modular drill according to an embodiment of the invention.
Figure 14:
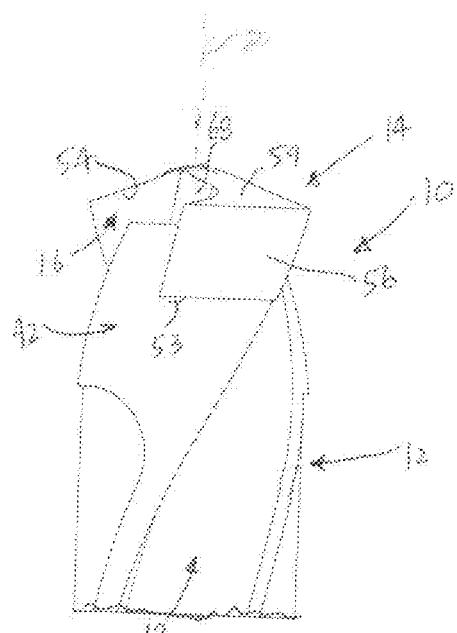
FIG. 14 is another side elevational view of the assembled modular drill of FIG. 13.
Figures 15, 16:
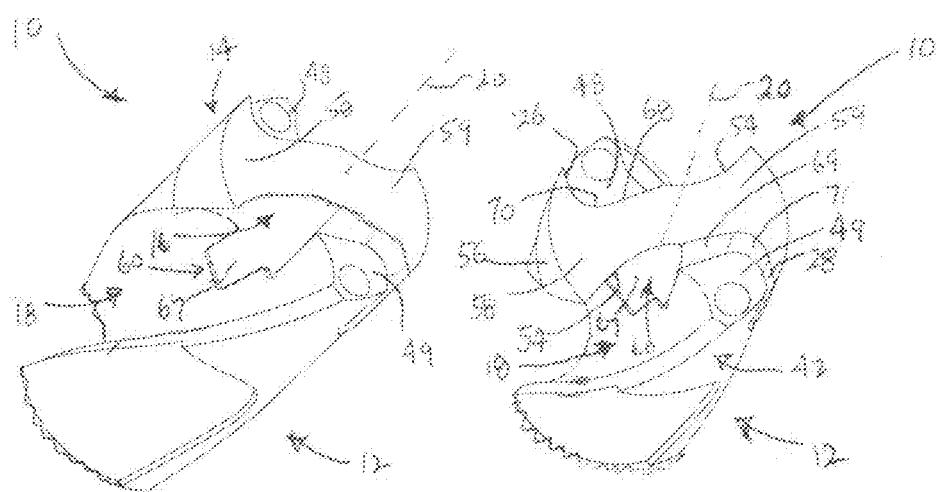
FIG. 15 is a top perspective view of the assembled modular drill of FIG. 13.
FIG. 16 is another top perspective view of the assembled modular drill of FIG. 13.

Each wall section 36, 38 also has an upwardly facing upper face 48, an upwardly facing lower faces 50, 52 and an elliptically-shaped undercut 53 between the upwardly facing lower face 50 and the driving surfaces 22, 24, the retention surfaces 46, 47 and the radius blends 49, 51. The undercut 53 provides a continuous and smooth transition between the faces 50, 52 and the driving surfaces 22, 24, which allows for reduction of stresses caused by the torque. In addition, the undercut 53 provides clearance for the cutting head 14 when mounted on the shank 12. The ellipse is oriented with its major axis 77 inclined rearward with respect to the upwardly facing lower faces 50, 52, as shown in FIG. 12.

The cutting head 14 has cutting edges (only the cutting edge 54 is visible in FIG. 1), a peripheral generally cylindrical outer surface 56, and a leading conical surface 58 which conical surface 58 is of course interrupted or incomplete due to presence of the flutes. The cutting edge 54 and the leading conical surface 58 collectively form a cutting portion which performs cutting operations to the work piece.

Any or all of the central floor portion 40, and the upwardly facing lower faces 50, 52 of the shank 12 serve as abutment surfaces that abut the downwardly facing cutting head faces 64, 66 of the cutting head 14 when the cutting head 14 is installed on the shank 12.

The cutting head 14 has a shank connection portion opposite the cutting portion, or alternatively stated, facing the trailing end 32 of the cutting head 14, in the form of an interlocking member arranged to retain the cutting head 14 within the pocket 34 of the shank 12. In the embodiment of FIG. 1, this interlocking member comprises a cylindrical member 60, which is located centrally along rotational axis 20. The cylindrical member 60 is so-called due to its characteristic cylindrical surface 62 arranged substantially parallel to the rotational axis 20. The cylindrical member 60 provides an interlocking member corresponding to and engaging the pocket 34, which the pocket 34 serves as an interlocking member of the shank 12. The cylindrical surface 62 cooperates with the cylindrical surfaces 44, 45 to provide an interference fit therebetween, and to accurately center the cutting head 14 with respect to the rotational axis 20 of the assembly 10. The cylindrical member 60 includes a chamfer 61 extending between the cylindrical surface 62 and an end surface 63 of the cylindrical member 60. The chamfer 61 provides clearance for the cutting head 14 when mounted onto the shank 12. The cylindrical member 60 also includes a lateral recess 65, 67 that modifies the cylindrical surface 62 and forms a portion of the cutting head flute portion 16 when the cutting head 14 is mounted onto the shank 12. A radiused surface 73 may be located between the cylindrical surface 62 and the faces 64, 66 to provide a smooth transition and resistance to cracks.

Surrounding the cylindrical member 60 is the cutting head faces 64, 66, which face downwardly in the depiction of FIG. 1. It should be understood at this point that cutting head 14 is generally bilaterally symmetrical, so that cutting head face 64 is generally a mirror image of cutting head face 66. In those embodiments where there may be three flutes, for example, there will accordingly be three, rather than two, similar cutting head faces corresponding to cutting faces 64, 66 disposed about the periphery of the cutting head 14.

The downward facing cutting head faces 64, 66 may be stepped, angled, or located at different levels or points along axis 20, in the same manner as and to correspond to the axial spacing apart of the faces 48, 50 of the shank 12. Any or all of the faces 64, 66 serve as abutment surfaces for abutting corresponding faces 48, 50 of the shank 12. The abutment of the faces 64, 66 with their corresponding faces 48, 50 of the shank 12 seats the cutting head 14 on the shank 12 responsive to compressive axial loading.

The cutting head 14 also includes vertically-angled retention surfaces 68, 69 that cooperate with the vertically-angled retention surfaces 46, 47 of the shank 12, and a radius blend 70, 71 between the vertically-angled retention surfaces 68, 69 and the driven surfaces 26, 28, respectively. The term "vertically-angled" is defined as being formed at a non-zero angle (i.e. non-parallel) with respect to the rotational axis 20 of the assembly 10. When rotated into the interlocked position with respect to pocket 34, each retention surface 68, 69 of the cutting head 14 cooperate with a respective vertically-angled retention surface 46, 47 of the pocket 34, thereby preventing disengagement of the cutting head 14 in the axial direction away from the shank 12. It is noted that the retention surfaces 68, 69 of the cutting head 14 are closer to the rotational axis 20 than the driven surfaces 26, 28. In other words, the retention surfaces 68, 69 of the cutting head 14 are radially inward (i.e., closer to the rotational axis 20) with respect to the driven surfaces 26, 28.

The radius blends 70, 71 of the cutting head 14 have a radius equal or smaller to the radius blends 49, 51 of the shank 12. In order to provide strength to the cutting head 14, the radius of blends 70, 71 need to be greater than 10% of the radius of the cylindrical outer surface 56. It has been found that an optimum range for the radius of the blends 70, 71 is between about 20% and about 40% of the radius of the cylindrical outer surface 56.

Figure 17:
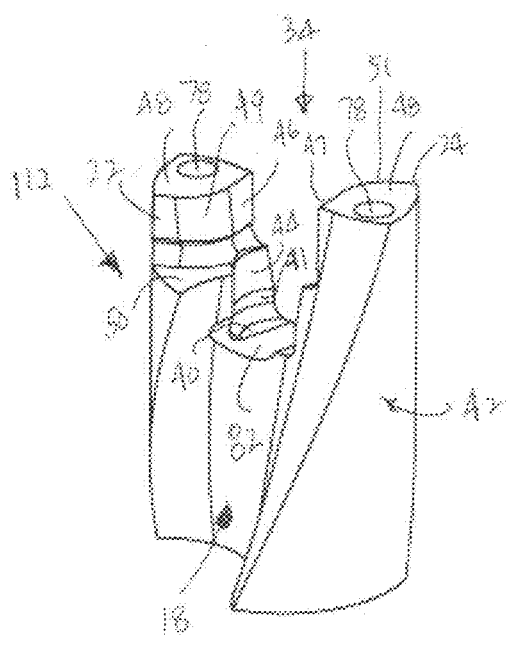
FIG. 17 is a side elevational view of the shank of the modular drill according to another embodiment of the invention.
Figure 18:
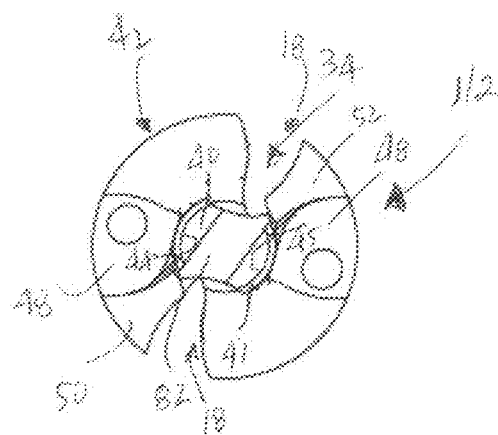
FIG. 18 is a top view of the shank of FIG. 17.

Referring now to FIGS. 17 and 18, a shank 112 is shown according to another embodiment of the invention. The shank 12 is identical to the shank 12, except the shank 112 includes a groove or recess 82 formed in the floor portion 40 of the pocket 34. It has been shown that the groove 82 reduces the stress and fatigue exerted on the shank 112, thereby greatly increasing the life of the shank 112 and the assembly 10.

The patents and publications referred to herein are hereby incorporated by reference.

Having described presently preferred embodiments the invention may be otherwise embodied within the scope of the appended claims.

What is claimed is:

1. A cutting tool assembly for conducting rotary cutting operations on a work piece comprising a tool shank and a replaceable cutting head which is installed on and engages the tool shank, the tool shank and the cutting head having a common rotational axis and complimentary peripheral surfaces when assembled together;

the shank having: a pocket for coupling to the cutting head, the pocket having a pair of wall sections, wherein each wall section comprises at least one internally facing, generally cylindrical surface projecting upwardly from a central floor portion, an interlocking member arranged to retain the cutting head when the cutting head is installed within the pocket, at least one axial abutment surface abutting the cutting head when the cutting head is installed within the pocket, at least one driving surface arranged to rotate the cutting head when the shank is rotated with the cutting head installed within the pocket, the at least one driving surface being vertical or angled forwardly, and at least one flat vertically-angled retention surface located closer to the rotational axis than the at least one driving surface; and the cutting head having: a peripheral base surface facing the pocket and a cylindrical member located centrally along the common rotational axis, a cutting portion at a leading end of the cutting tool assembly, and a shank connection portion opposite the cutting portion and facing a trailing end of the shank connection portion, a corresponding interlocking member for engaging the interlocking member of the shank, a cutting head abutment surface abutting the at least one abutment surface of the shank when the cutting head is installed within the pocket, a driven surface oriented to abut the driving surface of the shank when the cutting head is installed within the pocket, and at least one vertically-angled retention surface oriented to abut the at least one vertically-angled retention surface of the shank when the cutting head is installed within the pocket.

2. The cutting tool assembly according to claim 1, wherein each wall section of the pair of wall sections has the at least one driving surface, the at least one vertically-angled retention surface, and a radius blend extending between the vertically-angled retention surface of the shank and the at least one driving surface.

3. The cutting tool assembly according to claim 2, further comprising an undercut between the at least one axial abutment surface and the at least one vertically-angled retention surface of the shank, the at least one driving surface and the radius blend.

4. The cutting tool assembly according to claim 3, wherein the undercut is elliptical-shaped.

5. The cutting tool assembly according to claim 1, wherein the cylindrical member of the cutting head has a chamfer extending between the cylindrical surface and an end surface of the cylindrical member.

6. The cutting tool assembly according to claim 1, wherein the at least one vertically-angled retention surface of the shank is formed at an angle, A1, of between five degrees and fifteen degrees with respect to the rotational axis.

7. The cutting tool assembly according to claim 1, wherein the at least one driven surface is formed at an angle, A2, of between zero degrees and twenty degrees with respect to a plane parallel to the rotational axis.

8. The cutting tool assembly according to claim 1, further comprising at least one coolant hole formed in the shank.

9. A cutting tool assembly for conducting rotary cutting operations on a work piece comprising a tool shank and a replaceable cutting head which is installed on and engages the tool shank, the tool shank and the cutting head having a common rotational axis and complimentary peripheral surfaces when assembled together;

the shank having: a pocket for coupling to the cutting head, the pocket having a pair of wall sections, wherein each wall section comprises at least one internally facing, generally cylindrical surface projecting upwardly from a central floor portion, an interlocking member arranged to retain the cutting head when the cutting head is installed within the pocket, a shank abutment surface abutting at least one abutment surface of the cutting head when the cutting head is installed within the pocket, at least one driving surface arranged to rotate the cutting head when the shank is rotated with the cutting head installed within the pocket, the at least one driving surface being vertical or angled forwardly, and at least one flat vertically-angled retention surface located radially inward with respect to the at least one driving surface; and the cutting head having: a peripheral base surface facing the pocket and a cylindrical member located centrally along the common rotational axis, a cutting portion at a leading end of the cutting tool assembly, and a shank connection portion opposite the cutting portion and facing a trailing end of the shank connection portion, a corresponding interlocking member for engaging the interlocking member of the shank, a cutting head abutment surface abutting the shank when the cutting head is installed within the pocket, a driven surface oriented to abut the driving surface of the shank when the cutting head is installed within the pocket, and a retention surface oriented to abut the at least one vertically-angled retention surface of the shank when the cutting head is installed within the pocket.

10. The cutting tool assembly according to claim 9, wherein each wall section of the pair of wall sections has the at least one driving surface, the at least one vertically-angled retention surface, and a radius blend extending between the vertically-angled retention surface and the at least one driving surface.

11. The cutting tool assembly according to claim 10, further comprising an undercut between the at least one abutment surface and the at least one vertically-angled retention surface, the at least one driving surface and the radius blend.

12. The cutting tool assembly according to claim 9, wherein the at least one vertically-angled retention surface of the shank is flat.

13. The cutting tool assembly according to claim 9, wherein the at least one vertically-angled retention surface is formed at an angle, A1, of between five degrees and fifteen degrees with respect to the rotational axis.

14. The cutting tool assembly according to claim 9, wherein the at least one driven surface is formed at an angle, A2, of between zero degrees and twenty degrees with respect to a plane parallel to the rotational axis.

15. The cutting tool assembly according to claim 9, further comprising at least one coolant hole formed in the shank.

16. The cutting tool assembly according to claim 1, wherein the cutting head includes a lateral recess forming part of a flute, and the shank has a complementing lateral recess which continues the part of a flute formed in the cutting head in continuous and undistorted fashion when the cutting head is installed within the pocket of the shank.

17. The cutting tool assembly according to claim 9, wherein the cutting head includes a lateral recess forming part of a flute, and the shank has a complementing lateral recess which continues the part of a flute formed in the cutting head in continuous and undistorted fashion when the cutting head is installed within the pocket of the shank.

* * * * *